US008738914B2

(12) United States Patent
Cao et al.

(10) Patent No.: US 8,738,914 B2
(45) Date of Patent: May 27, 2014

(54) METHOD AND SYSTEM FOR KEY EXCHANGE AND METHOD AND APPARATUS FOR REDUCING PARAMETER TRANSMISSION BANDWIDTH

(75) Inventors: Zhenfu Cao, Shanghai (CN); Xiaolei Dong, Shanghai (CN); Jun Shao, Shanghai (CN); Jiwei Wei, Shenzhen (CN)

(73) Assignees: Huawei Technologies Co., Ltd., Shenzhen (CN); Shanghai Jiaotong University, Shanghai (CN)

( * ) Notice: Subject to any disclaimer, the term of this patent is extended or adjusted under 35 U.S.C. 154(b) by 720 days.

(21) Appl. No.: 12/482,821

(22) Filed: Jun. 11, 2009

(65) Prior Publication Data

US 2009/0271628 A1    Oct. 29, 2009

Related U.S. Application Data

(63) Continuation of application No. PCT/CN2007/070944, filed on Oct. 23, 2007.

(30) Foreign Application Priority Data

Dec. 15, 2006  (CN) .......................... 2006 1 0167172

(51) Int. Cl.
  *H04L 9/00* (2006.01)
(52) U.S. Cl.
  USPC ....................................................... 713/171
(58) Field of Classification Search
  USPC ....................................................... 713/171
  See application file for complete search history.

(56) References Cited

U.S. PATENT DOCUMENTS

| 6,434,561 B1 | 8/2002 | Durst, Jr. et al. |
| 7,076,061 B1 * | 7/2006 | Lenstra et al. ................... 380/44 |
| 7,421,583 B1 * | 9/2008 | Berson et al. ................. 713/170 |
| 7,565,537 B2 * | 7/2009 | Morais et al. ................. 713/169 |

(Continued)

FOREIGN PATENT DOCUMENTS

CN      1761186 A      4/2006

OTHER PUBLICATIONS

International Search Report issued in corresponding PCT Application No. PCT/CN2007/070944; mailed Feb. 14, 2008.

(Continued)

*Primary Examiner* — Azizul Choudhury
*Assistant Examiner* — Tariq Najee-Ullah
(74) *Attorney, Agent, or Firm* — Brinks Gilson & Lione (57) ABSTRACT

The embodiments of the present disclosure disclose a method and apparatus for reducing the parameter transmission bandwidth. The parameter sender reduces the values of the parameters before sending the parameters to the parameter receiver. This scheme reduces the bandwidth consumed during parameter transmission, thus makes the transmission more efficient. The embodiment of the present disclosure also discloses a method for key exchange. This method reduces the values of the transmission parameters before sending the transmission parameters. This saves the bandwidth compared with the protocol in the prior art. Besides, the embodiment of the present disclosure discloses a system for key exchange. The parameter sender sends the transmission parameters to the bandwidth processing unit. The bandwidth processing unit performs a modulo operation on the received transmission parameters and then sends the processed transmission parameters to the parameter receiver, thus reducing the bandwidth consumed in the transmission of transmission parameters.

1 Claim, 4 Drawing Sheets

(56) References Cited

U.S. PATENT DOCUMENTS

| | | | |
|---|---|---|---|
| 7,600,118 B2* | 10/2009 | Lee et al. | 713/168 |
| 7,707,420 B1* | 4/2010 | Little | 713/176 |
| 2003/0072059 A1* | 4/2003 | Thomas et al. | 359/167 |
| 2003/0229789 A1* | 12/2003 | Morais et al. | 713/171 |
| 2006/0209789 A1* | 9/2006 | Gupta et al. | 370/352 |
| 2010/0040236 A1* | 2/2010 | Xu et al. | 380/279 |

OTHER PUBLICATIONS

Office Action issued in corresponding Chinese Patent Application No. 200610167172.3, mailed Jul. 3, 2009.

Written Opinion of the International Searching Authority issued in corresponding PCT Patent Application No. PCT/CN2007/070944, mailed Feb. 14, 2008.

International Telecommunications Union, "Draft Recommendation X.pak, Password-Authenticated Key Exchange (PAK) Protocol", Telecommunication Standardization Sector—Study Group 17. Geneva, Dec. 6-15, 2006.

Office Action issued in corresponding Korean Patent Application No. 10-2009-7013228, mailed Aug. 31, 2011.

Office Action issued in corresponding Canadian Patent Application No. 2,668,929, mailed Nov. 18, 2011.

Office Action issued in corresponding Canadian Patent Application No. 2,668,929, mailed Dec. 5, 2012.

\* cited by examiner

METHOD AND SYSTEM FOR KEY EXCHANGE AND METHOD AND APPARATUS FOR REDUCING PARAMETER TRANSMISSION BANDWIDTH

CROSS-REFERENCE TO RELATED APPLICATIONS

This application is a continuation of International Application No. PCT/CN2007/070944, filed on Oct. 23, 2007, titled "Method and System for Key Exchange and Method and Apparatus for Reducing Parameter Transmission Bandwidth", which claims the priority of Chinese application No. 200610167172.3, filed on Dec. 15, 2006, titled "Method and Apparatus for Reducing Parameter Transmission Bandwidth and Method for Key Exchange". The contents of the above identified applications are incorporated herein by reference in their entirety.

FIELD OF THE INVENTION

The present disclosure relates to network security technologies, and in particular, to a method and apparatus for reducing the parameter transmission bandwidth and a method and system for key exchange.

BACKGROUND OF THE DISCLOSURE

Some security protocols in network security technologies specify that entities that establish communications need to transmit some critical parameters. For example, the password-based key exchange authentication protocol for improving Diffie-Hellman key exchange specifies that entities that establish communications need to transmit parameters.

The purpose of Diffie-Hellman key exchange is to allow two users to exchange a key securely for future message encryptions. The security of Diffie-Hellman key exchange depends on the difficulty of computing discrete logarithms on finite fields. This algorithm provides full forward confidentiality, but is vulnerable to man-in-the-middle attacks.

The password-based key exchange authentication protocol is designed to alleviate man-in-the-middle attacks for Diffie-Hellman key exchange. The password authentication protocol depends on a poor and hidden shared secret and provides a specific mechanism for mutual authentication. Therefore, this authentication protocol can prevent offline dictionary and man-in-the-middle attacks.

The password-based key exchange authentication protocol has two communication entities A and B. Entities A and B share a secret password PW and public Diffie-Hellman parameters p and g. These parameters meet the following conditions: p is a secure prime number, making it difficult to compute discrete logarithms; the integer g is a primitive root of p and its step in $Z_p^*$ is p−1, that is, $$g^{p-1} = 1 \bmod p.$$

Figure 1:
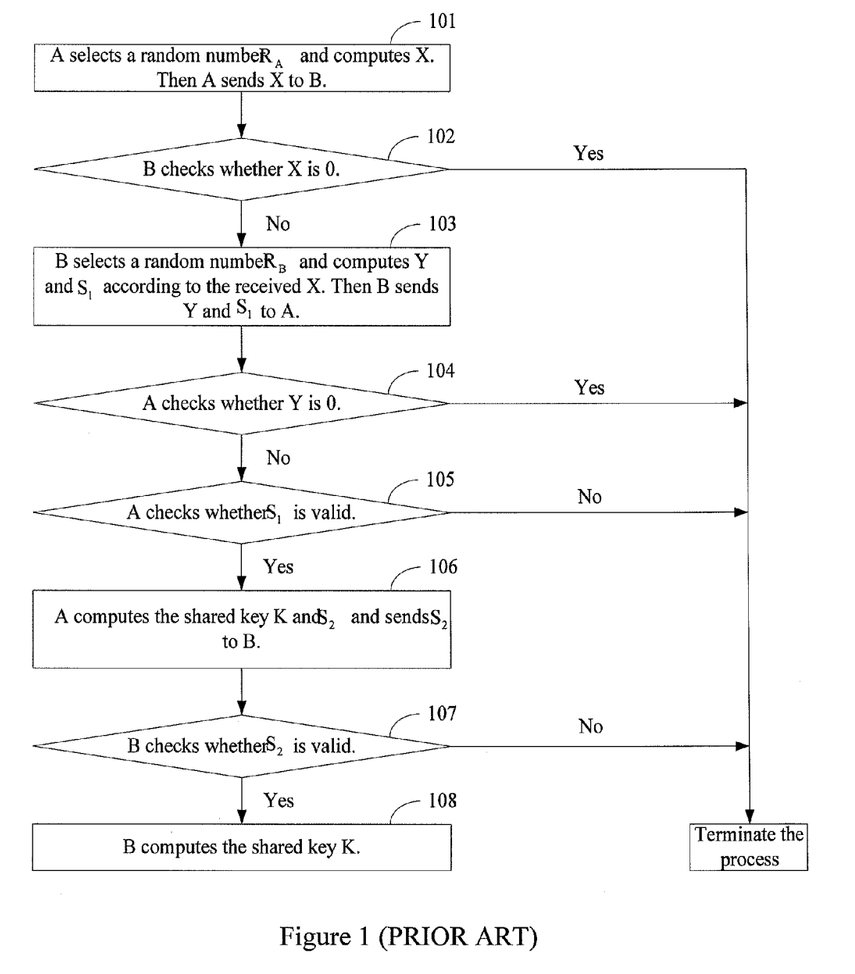
FIG. 1 shows the process of key exchange as specified in the password-based key exchange authentication protocol in the prior art.

FIG. 1 shows the process of key exchange as specified by the password-based key exchange authentication protocol in the prior art. The process includes the following steps:

Step 101: Communication entity A selects a random number $R_A$ to compute the transmission parameter by the formula $X = H_1(A_A|B_B|PW) \cdot (g^{R_A} \bmod p)$, and then sends transmission parameter X to communication entity B.

$A_A$ and $B_A$ belong to communication entities A and B respectively and are parameters known to entities A and B, such as addresses of entities A and B.

| is a concatenation symbol. For example, a|b indicates the concatenation of bit strings a and b.

mod is the modulo operator. For example, a mod b indicates the smallest non-negative remainder after positive integer a is divided by positive integer b.

$H_i(u)$ indicates the hash function. It is a function used to compress bit string u in any length into a message digest in a fixed length. i is equal to 1, 2, 3 or any other natural number. Different i subscripts indicate different random functions that are mutually independent.

Step 102: Upon receipt of transmission parameter X from communication entity A, communication entity B checks whether X is 0. If yes, communication entity B terminates the process; otherwise communication entity B executes step 103.

Step 103: Communication entity B computes $$\frac{X}{H_1(A_A|B_B|PW)}$$

to obtain $g^{R_A} \bmod p$, and selects a random number $R_B$ to compute transmission parameter Y and identity authentication parameter $S_1$. Finally communication entity B sends Y and $S_1$ to communication entity A. The formulas below are used to compute transmission parameter Y and identity authentication parameter $S_1$:

$$Y = H_2(A_A|B_B|PW) \cdot (g^{R_B} \bmod p)$$

$$S_1 = H_3\left(A_A|B_B|PW \left|\frac{X}{H_1(A_A|B_B|PW)}\right| g^{R_B} \bmod p \left|\left\{\left[\frac{X}{H_1(A_A|B_B|PW)}\right]^{R_B} \bmod p\right\}\right.\right)$$

$$= H_3(A_A|B_B|PW|g^{R_A} \bmod p|g^{R_B} \bmod p|\{[g^{R_A}]^{R_B} \bmod p\})$$

Step 104: Upon receipt of transmission parameter Y from communication entity B, communication entity A checks whether Y is 0. If yes, communication entity A terminates the process; otherwise communication entity A executes step 105.

Step 105: Communication entity A checks whether identity authentication parameter $S_1$ sent from communication entity B is valid. If yes, communication entity A executes step 106; otherwise communication entity A terminates the process.

Communication entity A checks identity authentication parameter $S_1$ by using the following method: compute $$\frac{Y}{H_2(A_A|B_B|PW)}$$

to obtain $g^{R_B} \bmod p$, and then check whether $S_1$ is equal to the computation result of formula 1. If yes, $S_1$ is valid; otherwise $S_1$ is invalid. The following shows formula 1:

$$H_3\left(A_A|B_B|PW|g^{R_A} \bmod p \left|\frac{Y}{H_2(A_A|B_B|PW)}\right.\right. \quad (1)$$

$$\left.\left\{\left[\frac{Y}{H_2(A_A|B_B|PW)}\right]^{R_A} \bmod p\right\}\right) =$$

$$H_3(A_A|B_B|PW|g^{R_A} \bmod p|g^{R_B} \bmod p|\{[g^{R_B}]^{R_A} \bmod p\})$$

Step 106. Communication entity A computes shared key K and identity authentication parameter $S_2$ and sends $S_2$ to communication entity B. The formulas below are used to compute shared key K and identity authentication parameter $S_2$:

$$K = H_5 \left( \begin{array}{c} A_A|B_B|PW|g^{R_A} \bmod p | \frac{Y}{H_2(A_A|B_B|PW)} | \\ \left\{ \left[ \frac{Y}{H_2(A_A|B_B|PW)} \right]^{R_A} \bmod p \right\} \end{array} \right)$$

$$= H_5(A_A|B_B|PW|g^{R_A} \bmod p|g^{R_B} \bmod p \mid \{[g^{R_B}]^{R_A} \bmod p\})$$

$$S_2 = H_4 \left( \begin{array}{c} A_A|B_B|PW|g^{R_A} \bmod p | \frac{Y}{H_2(A_A|B_B|PW)} | \\ \left\{ \left[ \frac{Y}{H_2(A_A|B_B|PW)} \right]^{R_A} \bmod p \right\} \end{array} \right)$$

$$= H_4(A_A|B_B|PW|g^{R_A} \bmod p|g^{R_B} \bmod p \mid \{[g^{R_B}]^{R_A} \bmod p\})$$

Step 107: Communication entity B checks whether identity authentication parameter $S_2$ sent from communication entity A is valid. If yes, communication entity B executes step 108; otherwise communication entity B terminates the process.

Communication entity B checks identity authentication parameter $S_2$ by using the following method: obtain $g^{R_B}$ mod p according to step 103, and then check whether $S_2$ is equal to the computation result of formula (2). If yes, $S_2$ is valid; otherwise $S_2$ is invalid. The following shows formula (2):

$$H_4 \left( A_A|B_B|PW| \frac{X}{H_1(A_A|B_B|PW)} \bigg| g^{R_B} \bmod p \right| \quad (2)$$

$$\left\{ \left[ \frac{X}{H_1(A_A|B_B|PW)} \right]^{R_B} \bmod p \right\} \bigg) =$$

$$H_4 \left( \begin{array}{c} A_A|B_B|PW|g^{R_A} \bmod p|g^{R_B} \bmod p| \\ \{[g^{R_A} \bmod p]^{R_B} \bmod p\} \end{array} \right)$$

Step 108: Communication entity B computes shared key K. The formula below is used to compute K:

$$K = H_5 \left( \begin{array}{c} A_A|B_B|PW| \frac{X}{H_1(A_A|B_B|PW)} \big| g^{R_B} \bmod p | \\ \left\{ \left[ \frac{X}{H_1(A_A|B_B|PW)} \right]^{R_B} \bmod p \right\} \end{array} \right)$$

$$= H_5(A_A|B_B|PW|g^{R_A} \bmod p|g^{R_B} \bmod p \mid \{[g^{R_B}]^{R_A} \bmod p\})$$

Now communication entities A and B have authenticated the identity of each other and obtained the shared key K. That is, the exchange of shared key K is complete between communication entities A and B.

In the above steps, $R_A$ and $R_B$ are discrete logarithms that take g as the base modulo p. It is difficult to compute $R_A$ and $R_B$ based on $g^{R_A}$ mod p and $g^{R_B}$ mod p. In this case, $R_A$ and $R_B$ are private keys of communication entities A and B. X and Y are public keys of communication entities A and B. $S_1$ and $S_2$ are parameters for communication entities A and B to authenticate the identity of each other.

Though the security of the password-based key exchange authentication protocol can be proved in the random oracle model and ideal cipher model, transmission parameters X and Y are required in the authentication process and parameters X and Y are equal to the product of two large integers. Hence, the transmission of these parameters consumes large bandwidth. By analogy, in other occasions in which parameter transmission is required, when the parameter value is large, large transmission bandwidth may be consumed.

SUMMARY OF THE DISCLOSURE

The objective of the embodiments of the present disclosure is to provide a method and system for key exchange, a method and apparatus for reducing the parameter transmission bandwidth to reduce the bandwidth consumed during parameter transmission. The technical scheme of the present disclosure is implemented as follows. An embodiment of the present disclosure discloses a computer implemented method for key exchange, including: reducing, by a parameter sender, the values of transmission parameters by performing a modulo operation on a transmission parameter; and sending, by the parameter sender, the reduced value of the transmission parameter to a parameter receiver.

An embodiment of the present disclosure discloses a system for key exchange, including: a parameter sender, a parameter receiver and a bandwidth processing unit, wherein: the parameter sender is configured to send the transmission parameter to the bandwidth processing unit; the bandwidth processing unit is configured to perform a modulo operation on the received transmission parameter and send the transmission parameter to the parameter receiver.

An embodiment of the present disclosure discloses a computer implemented method for reducing the parameter transmission bandwidth, including: reducing, by a parameter sender, a value of a transmission parameter; sending, by the parameter sender, the reduced value of the transmission parameter to a parameter receiver.

An embodiment of the present disclosure also discloses an apparatus for reducing the parameter transmission bandwidth, wherein: the apparatus is configured to receive the parameter from a parameter sender, reduce a value of the parameter, and send the reduced value of the parameter to a parameter receiver.

Based on the preceding technical scheme of embodiments of the present disclosure, the values of the parameters are reduced before the parameters are sent to the parameter receiver. This reduces the bandwidth consumed during parameter transmission and makes the transmission more efficient.

DETAILED DESCRIPTION OF THE DISCLOSURE

The technical scheme in an embodiment of the present disclosure is described as follows: During the data transmission, the bandwidth consumed is reduced by reducing the values of the parameters so as to increase the transmission efficiency.

Figure 2:
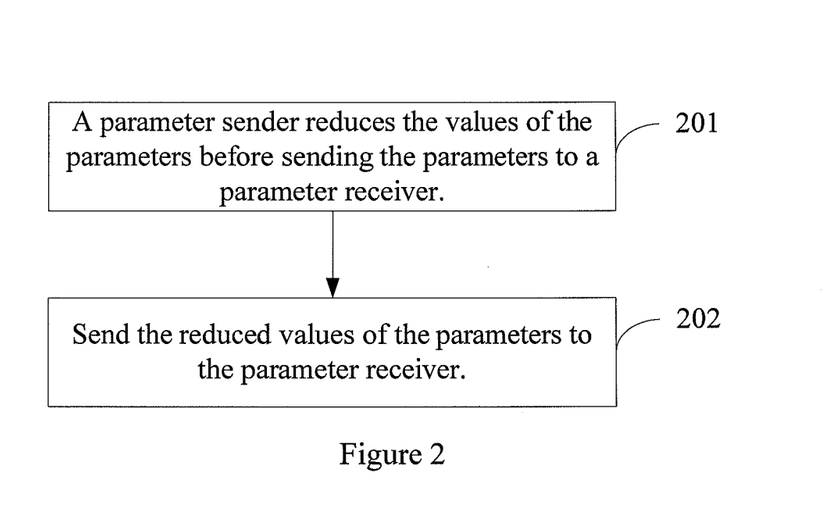
FIG. 2 shows the method for reducing the parameter transmission bandwidth in an embodiment of the present disclosure.

FIG. 2 shows a method for reducing the parameter transmission bandwidth in an embodiment of the present disclosure. As shown in FIG. 2, the method includes the following blocks:

Block 201: A parameter sender reduces the values of the parameters before sending the parameters to a parameter receiver.

Block 202: The parameter sender sends the reduced values of the parameters to the parameter receiver.

Figure 3:
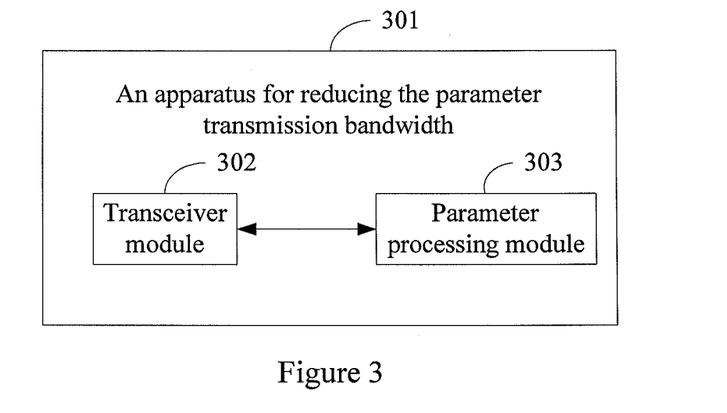
FIG. 3 shows the structure of an apparatus for reducing the parameter transmission bandwidth in an embodiment of the present disclosure.

FIG. 3 shows the structure of an apparatus for reducing the parameter transmission bandwidth in an embodiment of the present disclosure. As shown in FIG. 3, an apparatus 301 for reducing the parameter transmission bandwidth includes a transceiver module 302 and a parameter processing module 303.

The transceiver module 302 is configured to receive the parameters from the parameter sender and send the parameters to the parameter processing module 303. Besides, the transceiver module 302 receives the parameters with reduced values from parameter processing module 303 and sends the parameters with reduced values to the parameter receiver.

The parameter processing module 303 is configured to receive the parameters from the transceiver module 302 and send back the parameters to the transceiver module 302 after reducing the values of the parameters.

The apparatus as shown in FIG. 3 may be integrated in the parameter sender or any third party system except the parameter sender and receiver. The third party system has other functions besides the functions shown in FIG. 3.

In the preceding method and apparatus for reducing the parameter transmission bandwidth, the values of the parameters can be reduced in the following ways: subtracting a constant from the parameters, multiplying the parameters by a number smaller than 1, or performing a modulo operation on the parameters.

The following describes the present disclosure in detail by using the transmission parameters specified in the password-based key exchange authentication protocol in combination with the accompanying drawings.

At least one of the transmission parameters as specified in the password-based key exchange authentication protocol is equal to the product of two large integers. Hence, the bandwidth consumed during parameter transmission is large. An embodiment of the present disclosure reduces the values of the transmission parameters by performing a modulo operation so as to develop a method for key exchange. This method can reduce the transmission width of the transmission parameters.

Figure 4:
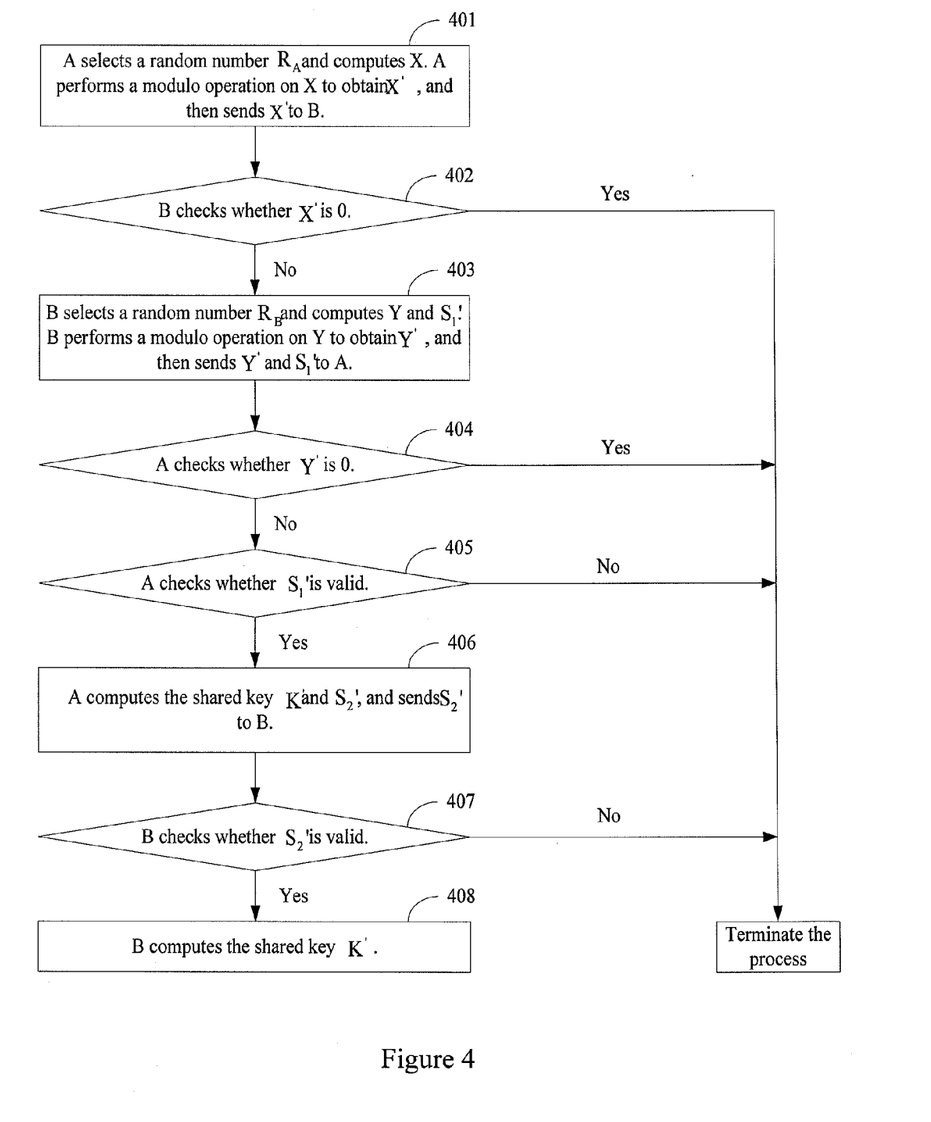
FIG. 4 shows a method for key exchange in an embodiment of the present disclosure.

FIG. 4 shows the method for key exchange in an embodiment of the present disclosure. As shown in FIG. 4, the method includes the following blocks:

Block 401: Communication entity A selects a random number $R_A$ to compute transmission parameter $X = H_1(A_A|B_B|PW) \cdot (g^{R_A} \bmod p)$. Communication entity A obtains X' after performing a modulo operation on transmission parameter X, and sends X' to communication entity B as the transmission parameter. The formula below is used to compute X':

$$X' = X \bmod p = [H_1(A_A|B_B|PW) \cdot g^{R_A}] \bmod p$$

In this block, because a modulo p operation is performed on X, the value of X' is smaller than p. Besides, the value of Diffie-Hellman parameter p is smaller than X.

In this block, the modulo p operation on transmission parameter X may be performed by using an apparatus as shown in FIG. 3 for reducing the parameter transmission bandwidth. In this case, the transceiver module 302 receives parameter X from communication entity A which is the parameter sender, and sends parameter X to the parameter processing module 303. Besides, it receives parameter X' from the parameter processing module 303 and sends parameter X' to communication entity B which is the parameter receiver.

The parameter processing module 303 receives parameter X from the transceiver module 302, obtains X' after performing a modulo operation on parameter X, and then sends X' to the transceiver module 302.

As seen from the above, the parameter processing module 303 in this embodiment is a modulo operation module. The parameter value is reduced by performing a modulo operation on the parameter.

Block 402: Upon receipt of transmission parameter X' from communication entity A, communication entity B checks whether X' is 0. If yes, communication entity B terminates the process; otherwise communication entity B executes block 403.

Block 403: Communication entity B computes $$\frac{X'}{H_1(A_A|B_B|PW)} \bmod p$$

to obtain $g^{R_A} \bmod p$, and selects a random number $R_B$ to compute transmission parameter Y and identity authentication parameter $S_1'$. Communication entity B then performs a modulo operation on transmission parameter Y to obtain transmission parameter Y', and sends transmission parameter Y' and identity authentication parameter $S_1'$ to communication entity A. The formulas below are used to compute Y, Y' and $S_1'$.

$$Y = H_2(A_A|B_B|PW) \cdot (g^{R_B} \bmod p)$$
$$Y' = Y \bmod p = [H_2(A_A|B_B|PW) \cdot g^{R_B}] \bmod p$$

$$S_1' = H_3\left(\begin{array}{c} A_A|B_B|PW \left| \frac{X'}{H_1(A_A|B_B|PW)} \bmod p \right| g^{R_B} \bmod p \right| \\ \left\{\left[\frac{X'}{H_1(A_A|B_B|PW)}\right]^{R_B} \bmod p\right\} \end{array}\right)$$

$$= H_3\left(\begin{array}{c} A_A|B_B|PW|g^{R_A} \bmod p|g^{R_B} \bmod p| \\ \{[g^{R_A}]^{R_B} \bmod p\} \end{array}\right)$$

In this block, because a modulo p operation is performed on Y, the value of Y' is smaller than p. Besides, the value of Diffie-Hellman parameter p is smaller than Y.

In this block, the modulo p operation on transmission parameter Y may also be performed by using an apparatus as shown in FIG. 3 for reducing the parameter transmission bandwidth. In this case:

The transceiver module 302 receives parameter Y from communication entity B, which is the parameter sender, and sends parameter Y to the parameter processing module 303. Besides, the transceiver module 302 receives parameter Y' from the parameter processing module 303 and sends parameter Y' to communication entity A which is the parameter receiver.

The parameter processing module 303 receives parameter Y from the transceiver module 302, obtains Y' after performing a modulo operation on parameter Y and then sends Y' to the transceiver module 302.

As seen from above, the parameter processing module 303 in this embodiment is a modulo operation module. The parameter value is reduced by performing a modulo operation on the parameter.

Block 404: Upon receipt of transmission parameter Y' from communication entity B, communication entity A checks whether Y' is 0. If yes, communication entity A terminates the process; otherwise communication entity A executes block 405.

Block 405: Communication entity A checks whether the identity authentication parameter $S_1'$ sent from communication entity B is valid. If yes, communication entity A executes block 406; otherwise communication entity A terminates the process.

Communication entity A checks the identity authentication parameter $S_1'$ by the following method: compute $$\frac{Y'}{H_2(A_A|B_B|PW)} \bmod p$$

to obtain $g^{R_B}$ mod p, and then check whether $S_1'$ is equal to the computation result of formula 3. If yes, $S_1'$ is valid; otherwise $S_1'$ is invalid. The following shows formula 3:

$$H_3\left(A_A|B_B|PW|g^{R_A} \bmod p\left|\frac{Y'}{H_2(A_A|B_B|PW)}\right.\right. \tag{3}$$
$$\left.\left.\bmod p\left|\left\{\left[\frac{Y'}{H_2(A_A|B_B|PW)}\right]^{R_A} \bmod p\right\}\right.\right) = \right.$$
$$H_3(A_A|B_B|PW|g^{R_A} \bmod p|g^{R_B} \bmod p|\{[g^{R_B}]^{R_A} \bmod p\})$$

Block 406: Communication entity A computes shared key K' and identity authentication parameter $S_2'$ and sends $S_2'$ to communication entity B. The formulas below are used to compute K' and $S_2'$.

$$K' = H_5\begin{pmatrix} A_A|B_B|PW|g^{R_A} \bmod p\left|\frac{Y'}{H_2(A_A|B_B|PW)} \bmod p\right| \\ \left\{\left[\frac{Y'}{H_2(A_A|B_B|PW)}\right]^{R_A} \bmod p\right\} \end{pmatrix}$$
$$= H_5\begin{pmatrix} A_A|B_B|PW|g^{R_A} \bmod p|g^{R_B} \bmod p| \\ \{[g^{R_B}]^{R_A} \bmod p\} \end{pmatrix}$$

$$S_2' = H_4\begin{pmatrix} A_A|B_B|PW|g^{R_A} \bmod p\left|\frac{Y'}{H_2(A_A|B_B|PW)} \bmod p\right| \\ \left\{\left[\frac{Y'}{H_2(A_A|B_B|PW)}\right]^{R_A} \bmod p\right\} \end{pmatrix}$$
$$= H_4\begin{pmatrix} A_A|B_B|PW|g^{R_A} \bmod p|g^{R_B} \bmod p| \\ \{[g^{R_B}]^{R_A} \bmod p\} \end{pmatrix}$$

Block 407: Communication entity B checks whether the identity authentication parameter $S_2'$ sent from communication entity A is valid. If yes, communication entity B executes block 408; otherwise communication entity B terminates the process.

Communication entity B checks identity authentication parameter $S_2'$ by the following method: obtain $g^{R_B}$ mod p according to block 405, and then check whether $S_2'$ is equal to the computation result of formula 4. If yes, $S_2'$ is valid; otherwise $S_2'$ is invalid. The following shows formula 4:

$$H_4(A_A|B_B|PW|\frac{X'}{H_1(A_A|B_B|PW)} \bmod \tag{4}$$
$$p|g^{R_B} \bmod p|\left\{\left[\frac{X'}{H_1(A_A|B_B|PW)}\right]^{R_B} \bmod p\right\}) =$$
$$H_4(A_A|B_B|PW|g^{R_A} \bmod p|g^{R_B} \bmod p|\{[g^{R_B}]^{R_A} \bmod p\})$$

Block 408: Communication entity B computes shared key K'. The formula below is used to compute K':

$$K' = H_5\begin{pmatrix} A_A|B_B|PW\left|\frac{X'}{H_1(A_A|B_B|PW)} \bmod p\right|g^{R_B} \bmod p\right| \\ \left\{\left[\frac{X'}{H_1(A_A|B_B|PW)}\right]^{R_B} \bmod p\right\} \end{pmatrix}$$
$$= H_5\begin{pmatrix} A_A|B_B|PW|g^{R_A} \bmod p|g^{R_B} \bmod p| \\ \{[g^{R_B}]^{R_A} \bmod p\} \end{pmatrix}$$

Now the exchange of shared key K' between communication entities A and B is complete.

In a method for key exchange in the preceding embodiment, a modulo operation is performed to reduce X and Y to X' and Y' respectively. This reduces the transmission bandwidth of transmission parameters compared with the password-based key exchange authentication protocol in the prior art.

Similarly, in other occasions in which parameter transmission is required, the method for reducing the bandwidth consumed during parameter transmission by reducing the parameter values is also applicable. The method for reducing the parameter values includes: subtracting a constant from the parameters, or multiplying the parameters by a number smaller than 1, or performing a modulo operation on the parameters as provided in an embodiment of the present disclosure.

When a modulo operation is performed to reduce the values of the transmission parameters, the formulas for computing the transmission parameters include Hash operation formula, or modulo index operation formula, or Hash operation formula and modulo index operation formula. Here the modulo index operation formula refers to the operation formula in which a modulo operation is performed on the index. $g^{R_A}$ mod p in FIG. 4 is such an example.

Figure 5:
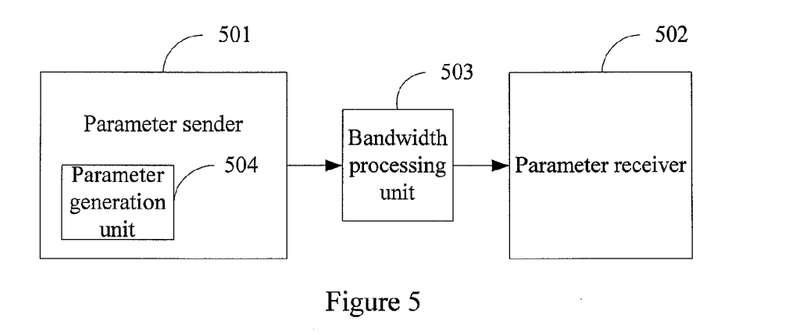
FIG. 5 shows the structure of an apparatus for key exchange in an embodiment of the present disclosure.

Based on the above embodiment, the following describes a system for key exchange as shown in FIG. 5.

FIG. 5 shows the structure of a system for key exchange in an embodiment of the present disclosure. As shown in FIG. 5, the system includes a parameter sender 501, a parameter receiver 502 and a bandwidth processing unit 503. The parameter sender 502 is configured to send the transmission parameters to the bandwidth processing unit 503. The bandwidth processing unit 503 is configured to perform a modulo operation on the received transmission parameters and then send the reduced values of the transmission parameters to the parameter receiver 502.

In FIG. 5, the parameter sender 501 includes a parameter generating unit 504. The parameter generating unit 504 is configured to generate transmission parameters for Hash operation formula and/or modulo index operation formula and send the generated transmission parameters to the bandwidth processing unit 503.

In FIG. 5, the parameter sender 501 is configured to send the transmission parameters of the key exchange method as specified in the password-based key exchange authentication protocol, to the bandwidth processing unit 503.

The bandwidth processing unit 503 may be integrated in the parameter sender 501 or any third party equipment except the parameter sender 501 and parameter receiver 502.

Although the disclosure has been described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. A method for key exchange, comprising:
    selecting, by a parameter sender A, a random number RA and computes X;
    performing, by the parameter sender A, a modulo operation on the X to obtain X', and
    then sends the X' to a parameter sender B;
    checking, by the parameter sender B, whether the X' is 0;
    selecting, by the parameter sender B, a random number $R_B$ and computes Y and $S_1'$; if the X' is not 0;
    performing, by the parameter sender B, a modulo operation on the Y to obtain Y', and
    then sending the Y' and the $S_1'$ to the parameter sender A;
    checking, by the parameter sender A, whether the Y' is 0;
    if the Y' is not 0; checking, by the parameter sender A, whether the Y' is valid;
    if the Y' is valid; computing, by the parameter sender A, the shared key K' and $S_2'$, and
    sending the $S_2'$ to the parameter sender B;
    checking, by the parameter sender B, whether the $S_2'$ is valid;
    computing, by the parameter sender B, the shared key K';
        wherein the method is based on the password-based key exchange authentication protocol;

$X = H_1(A_A|B_B|PW) \cdot (g^{R_A} \bmod p);$ $X' = X \bmod p = [H_1(A_A|B_B|PW) \cdot g^{R_A}] \bmod p;$ $Y = H_2(A_A|B_B|PW) \cdot (g^{R_B} \bmod p);$ $Y' = Y \bmod p = [H_2(A_A|B_B|PW) \cdot g^{R_B}] \bmod p;$ $$S_1' = H_3\left(A_A|B_B|PW \left| \frac{X'}{H_1(A_A|B_B|PW)} \bmod p \right| g^{R_B} \bmod p \right.$$
$$\left. \left\{ \left[ \frac{X'}{H_1(A_A|B_B|PW)} \right]^{R_B} \bmod p \right\} \right) =$$
$$H_3(A_A|B_B|PW|g^{R_A} \bmod p|g^{R_B} \bmod p|\{[g^{R_A}]^{R_B} \bmod p\})$$

$$K' = H_5\left(A_A|B_B|PW|g^{R_A} \bmod p \left| \frac{Y'}{H_2(A_A|B_B|PW)} \bmod p \right.\right.$$
$$\left.\left. \left\{ \left[ \frac{Y'}{H_2(A_A|B_B|PW)} \right]^{R_A} \bmod p \right\} \right) =$$
$$H_5(A_A|B_B|PW|g^{R_A} \bmod p|g^{R_B} \bmod p|\{[g^{R_B}]^{R_A} \bmod p\})$$

$$S_2' = H_4(A_A|B_B|PW|g^{R_A} \bmod p \left| \frac{Y'}{H_{21}(A_A|B_B|PW)} \bmod p \right.$$
$$\left. \left\{ \left[ \frac{Y'}{H_2(A_A|B_B|PW)} \right]^{R_A} \bmod p \right\} \right) =$$
$$H_4(A_A|B_B|PW|g^{R_A} \bmod p|g^{R_B} \bmod p|\{[g^{R_B}]^{R_A} \bmod p\});$$

$A_A$ and $B_A$ are parameters belonging to the parameter sender and the parameter receiver respectively and are known to the parameter sender and the parameter receiver;

PW is a secret password shared by the parameter sender and the parameter receiver;

$R_A$ is private key of the parameter sender;

p is a prime number; g is a positive integer; p and g are parameter of Diffie-Hellman;

| is a concatenation symbol;

mod is the modulo operator;

$H_1(*)$ indicates the hash function.

* * * * *